United States Patent
Takahashi et al.

(10) Patent No.: US 10,172,144 B2
(45) Date of Patent: Jan. 1, 2019

(54) USER EQUIPMENT, BAND BALANCING CONTROLLER AND RS-SINR REPORTING METHOD

(71) Applicant: NTT DOCOMO, INC., Tokyo (JP)

(72) Inventors: Hideaki Takahashi, Tokyo (JP); Kengo Yagyu, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/117,874

(22) PCT Filed: Feb. 17, 2015

(86) PCT No.: PCT/JP2015/054286
§ 371 (c)(1),
(2) Date: Aug. 10, 2016

(87) PCT Pub. No.: WO2015/125775
PCT Pub. Date: Aug. 27, 2015

(65) Prior Publication Data
US 2017/0013631 A1    Jan. 12, 2017

(30) Foreign Application Priority Data
Feb. 19, 2014    (JP) ................. 2014-029796

(51) Int. Cl.
*H04W 72/08*    (2009.01)
*H04W 24/10*    (2009.01)
(Continued)

(52) U.S. Cl.
CPC ......... *H04W 72/085* (2013.01); *H04L 5/0037* (2013.01); *H04L 5/0048* (2013.01);
(Continued)

(58) Field of Classification Search
None
See application file for complete search history.

(56) References Cited

U.S. PATENT DOCUMENTS

| | | | |
|---|---|---|---|
| 8,520,617 B2 * | 8/2013 | Krishnamurthy | ... H04W 72/082 370/329 |
| 2011/0081868 A1 | 4/2011 | Kim et al. | |

(Continued)

FOREIGN PATENT DOCUMENTS

| | | |
|---|---|---|
| CN | 103220704 A | 7/2013 |
| EP | 2800412 A1 | 11/2014 |
| WO | 2009022805 A1 | 2/2009 |

OTHER PUBLICATIONS

Office Action dated Dec. 13, 2016 in corresponding Japanese Patent Application No. 2014-029796 (5 pages).
(Continued)

*Primary Examiner* — Brian S Roberts
(74) *Attorney, Agent, or Firm* — Osha Liang LLP

(57) ABSTRACT

A user apparatus in a mobile communication system supporting carrier aggregation includes a measurement unit configured to measure an rs-sinr (reference signal-signal to interference and noise ratio) for a reference signal in a physical downlink control channel transmitted from a base station; and a reporting unit configured to report the measured rs-sinr to the base station in accordance with a predefined reporting trigger.

4 Claims, 7 Drawing Sheets

(51) Int. Cl.
*H04L 5/00* (2006.01)
*H04W 72/04* (2009.01)
(52) U.S. Cl.
CPC ......... *H04W 24/10* (2013.01); *H04W 72/042* (2013.01); *H04W 72/0413* (2013.01); *H04W 72/0486* (2013.01); *H04L 5/0007* (2013.01)

(56) References Cited

U.S. PATENT DOCUMENTS

| | | | |
|---|---|---|---|
| 2013/0010624 A1* | 1/2013 | He | H04L 41/5009 370/252 |
| 2013/0153298 A1* | 6/2013 | Pietraski | E21B 7/04 175/45 |
| 2013/0294352 A1* | 11/2013 | Park | H04B 7/024 370/328 |
| 2013/0301422 A1 | 11/2013 | Caretti et al. | |
| 2013/0308485 A1 | 11/2013 | Krishnamurthy et al. | |
| 2013/0344873 A1* | 12/2013 | Sane | H04W 36/30 455/437 |
| 2014/0328327 A1* | 11/2014 | Xiao | H04W 36/0088 370/332 |

OTHER PUBLICATIONS

Office Action issued in the counterpart New Zealand Patent Application No. 723019, dated Jun. 27, 2017 (3 pages).
Office Action issued in the counterpart New Zealand Patent Application No. 723019, dated Mar. 27, 2017 (3 pages).
International Search Report issued in corresponding application No. PCT/JP2015/054286 dated May 26, 2015 (4 pages).
Written Opinion of the International Searching Authority issued in corresponding application No. PCT/JP2015/054286 dated May 26, 2015 (4 pages)
3GPP TS 36.300 V12.0.0, "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 12)"; Dec. 2013 (208 pages).
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)"; Dec. 2013 (349 pages).
3GPP TS 36.133 V12.2.0, "3rd Generation Partnership Project; Technical Specification Group Radio Access Network; Evolved Universal Terrestrial Radio Access (E-UTRA); Requirements for support of radio resource management (Release 12)"; Dec. 2013 (815 pages).
3GPP TS 36.214 V11.1.0, "3rd Generation Partnership Project; Technical Specification Group Radio Access Network; Evolved Universal Terrestrial Radio Access (E-UTRA); Physical layer; Measurements (Release 11)"; Dec. 2012 (14 pages).
NTT Docomo, Inc., CMCC, "Load balancing enhancements for multiple carrier deployments"; 3GPP TSG-RAN WG2 #86, R2-142014; Seoul, Korea; May 19-23, 2014 (4 pages).
Office Action issued in corresponding New Zealand Application No. 723019, dated Nov. 28, 2016 (3 pages).
European Search Report issued in corresponding European Application No. 15751740.0, dated Jan. 30, 2017 (7 pages).
Office Action issued in corresponding European Patent Application No. 15751740.0, dated Nov. 20, 2017 (9 pages).
3GPP TS 36.331 V10.5.0, "3rd Generation Partnership Project; Technical Specification Group Radio Access Network; Evolved Universal Terrestrial Radio Access (E-UTRA); Radio Resource Control (RRC); Protocol specification (Release 10)" Mar. 2012 (302 pages).

\* cited by examiner

USER DISTRIBUTION

BAND BALANCING

USER EQUIPMENT, BAND BALANCING CONTROLLER AND RS-SINR REPORTING METHOD

TECHNICAL FIELD

The present invention relates to a radio communication system.

BACKGROUND ART

Typically, multiple frequency bands are assigned to an operator of a radio communication system, and the respective operators use the assigned frequency bands (carriers) to provide radio communication services to user equipments (UEs) such as mobile phones and smartphones. In order to utilize these multiple frequency bands efficiently, the operators control to distribute the user equipments over the frequency bands (band balancing control or inter-frequency balancing control).

In the example as illustrated in FIG. 1, two frequency bands 1.5 GHz and 2 GHz are assigned to a certain operator, and the certain operator uses these two frequency bands to provide radio communication services to the user equipments. For example, in the case where the many user equipments reside in the frequency band of 1.5 GHz whereas the cell for the frequency band of 2 GHz is relatively sparse as illustrated in the left side in FIG. 1, a base station or a band balancing controller performs band balancing control or inter-frequency balancing control to cause the user equipments using the cell for the frequency band of 1.5 GHz to migrate to the cell for the frequency band of 2 GHz so as to achieve uniform amounts of traffic over these two carriers, as illustrated in the right side in FIG. 1.

For example, after the user equipment has entered an RRC_CONNECTED state in a camped cell at outgoing and incoming calls, the base station or the band balancing controller causes the user equipment to measure RSRQ (Reference Signal Received Quality) in the cells for the two frequency bands 1.5 GHz and 2 GHz and report the measured RSRQ. Based on the RSRQ for the two cells reported from the user equipment and congestion status, the base station or the band balancing controller causes the user equipment to perform handover to the cell for an appropriate one of the frequency bands. Alternatively, the base station or the band balancing controller causes the user equipment to report the RSRQ at terminating calls and migrate to the cell for the appropriate frequency band by an RRC Connection Release based on the reported RSRQ and the congestion status for the respective cells.

See 3GPP TS 36.300 V12.0.0 (2013-12), 3GPP TS 36.331 V12.0.0 (2013-12) and 3GPP TS 36.133 V12.2.0 (2013-12) in detail, for example.

SUMMARY OF INVENTION

The RSRQ is useful as an indicator indicative of quality of signals received at the user equipment from the base station and can be used as one indicator for estimation of a throughput feasible in a band balancing target cell. On the other hand, as illustrated in FIG. 2, it is known that as the RSRQ value is higher, the range of throughput may be wider. Accordingly, in the case where the RSRQ is used, there is a likelihood that the feasible throughput in the band balancing target cell cannot be properly estimated. In addition, it is known that the relationships between the RSRQ and the estimated throughput may be different depending on load in the band balancing target cell. Specifically, as illustrated in FIG. 2, versions of full load, medium load and low load have different points where the throughput drastically increases relative to the RSRQ, and accordingly it may be impossible to estimate the feasible throughput in the band balancing target cell properly.

Meanwhile, it is known that the throughput is almost linearly proportional to the SINR (Signal to Interference and Noise Ratio), as illustrated in FIG. 3. To this end, if the user equipment could report the SINR in the band balancing target cell, it is considered that the feasible throughput can be estimated for the band balancing target cell at a higher accuracy. In LTE systems, the user equipment measures the SINR for a PDCCH (Physical Downlink Control Channel) to monitor radio links, and the SINR for the PDCCH is measured for reference signals in a PDCCH transmission domain (see 3GPP TS 36.133 V12.2.0 (2013-12), for example). Here, the SINR for the PDCCH can be referred to as a RS-SINR (Reference Signal-Signal to Interference and Noise Ratio). However, no scheme to report the measured RS-SINR to a base station has been specified at the present time.

One or more embodiments of the present invention provide a scheme to report the RS-SINR measured at the user equipment to a base station.

In one aspect, one or more embodiments of the present invention relates to user equipment that comprises a measurement unit configured to measure an RS-SINR (Reference Signal-Signal to Interference and Noise Ratio) for a reference signal in a physical downlink control channel transmitted from a base station; and a reporting unit configured to report the measured RS-SINR to the base station in accordance with a predefined reporting trigger.

According to one or more embodiments of the present invention, it is possible to provide a scheme to report the RS-SINR measured at the user equipment to a base station.

EMBODIMENTS OF THE INVENTION

Embodiments of the present invention are described below with reference to the drawings.

Some techniques are disclosed below for implementing advantageous band balancing control for user equipment having a multiband function for communication in multiple frequency bands. In embodiments as stated below, the RS-SINR is used for enabling the throughput in a band balancing target cell to be estimated in the band balancing control with a high accuracy. The user equipment measures the RS-SINR for a reference signal in a physical downlink control channel transmitted from a base station and reports the measured RS-SINR to the base station in accordance with a predefined reporting trigger. The predefined reporting trigger may be based on the measured RS-SINR value. Alternatively, in cases where an RSRP or an RSRQ is measured together with the RS-SINR, the predefined reporting trigger may be based on the measured RSRP or RSRQ value.

Figure 4:
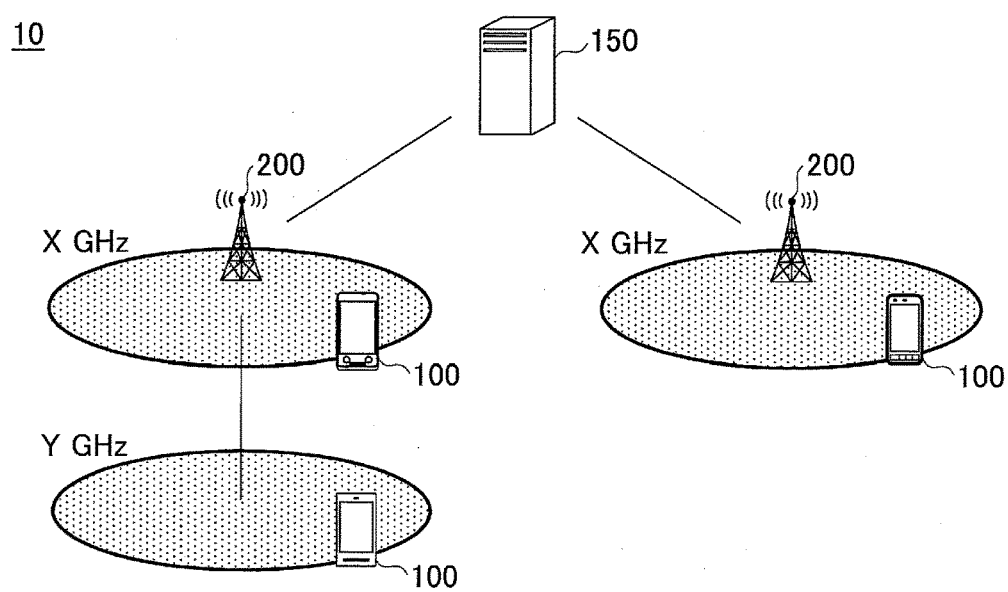
FIG. 4 is a schematic diagram for illustrating a radio communication system according to one or more embodiments of the present invention.

At the outset, a radio communication system according to one or more embodiments of the present invention is described with reference to FIG. 4. FIG. 4 is a diagram for schematically illustrating a radio communication system according to one or more embodiments of the present invention.

As illustrated in FIG. 4, a radio communication system 10 has one or more user equipments (UEs) 100, a band balancing controller 150 and one or more base stations (eNBs) 200. In this example, the radio communication system 10 is an LTE system or an LTE-Advanced system, but is not limited to it, and may be any appropriate radio communication system for providing radio communication services to the user equipments having a multiband function.

In the radio communication system 10 according to one or more embodiments, the single base station 200 may serve cells for two different frequency bands X GHz and Y GHz, and band balancing may be performed within the base station 200. Alternatively, two different base stations 200 serve cells for two different frequency bands X GHz and Y GHz, and the band balancing may be performed between the base stations 200. In the former case, the band balancing controller 150 is typically installed in the base station 200, and in the latter case, the band balancing controller 150 may be typically communicatively connected to the different base stations 200, as illustrated.

Typically, the user equipment 100 may be any appropriate information processing device having a radio communication function and supporting a multiband function for enabling radio communication in multiple frequency bands, such as a mobile phone, a smartphone, a tablet and a mobile router. In a typical hardware arrangement, the user equipment 100 has a CPU (Central Processing Unit) such as a processor, a memory device such as a RAM (Random Access Memory), an auxiliary storage device such as a hard disk device, a communication device for communicating radio signals, an interface device for interfacing with users, and so on. Functions of the user equipment 100 as stated below may be implemented by the CPU loading data and programs stored in the auxiliary storage device via the communication device and/or the interface device into the memory device and processing the data in accordance with the loaded programs. Alternatively, the functions may be implemented in some circuits providing the function.

The band balancing controller 150 performs band balancing control over the user equipment 100 based on the RS-SINR received from the user equipment 100. In one or more embodiments, the band balancing controller 150 determines whether the user equipment 100 should migrate to a cell for a different frequency band based on the RS-SINRs for the camped cell and/or a candidate band balancing target cell received from the user equipment 100, traffic status for these cells and so on, and indicates the band balancing target cell for migration to the user equipment 100 via the base station 200. In the illustrated embodiment, the band balancing controller 150 is provided as an upper station for the base station 200, but the present invention is not limited to it. For example, if the single base station 200 serves cells for different frequency bands, the band balancing controller 150 may be accommodated in the base station 200.

The base station 200 wirelessly connects to the user equipment 100 to transmit downlink data received from a communicatively connected upper station or server (not shown) to the user equipment 100 as well as transmit uplink data received from the user equipment 100 to the upper station (not shown). In one or more embodiments, the base station 200 confirms UE Capability obtained from the camping user equipment 100 and determines whether the camping user equipment 100 has a multiband function for communication in multiple frequency bands. If the user equipment 100 has the multiband function, the base station 200 causes the user equipment 100 to measure the RS-SINR in cells for multiple frequency bands and receives the measured RS-SINR from the user equipment 100. Upon receiving the measured RS-SINRs in cells for multiple frequency bands from the user equipment 100, the base station 200 forwards the received RS-SINRs to the band balancing controller 150 and indicates a band balancing target cell to the user equipment 100 as a result of the band balancing control.

Figure 5:
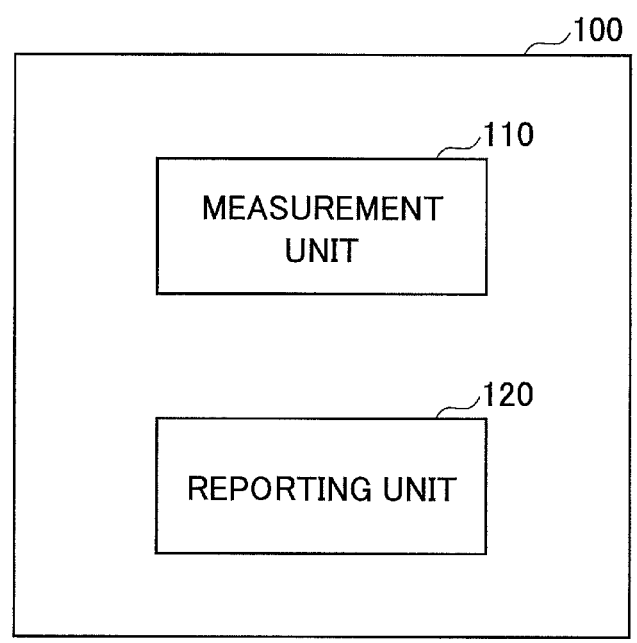
FIG. 5 is a block diagram for illustrating an arrangement of user equipment according to one or more embodiments of the present invention.

Next, an arrangement of user equipment according to one or more embodiments of the present invention is described with reference to FIG. 5. FIG. 5 is a diagram for illustrating an arrangement of the user equipment according to one or more embodiments of the present invention.

As illustrated in FIG. 5, the user equipment 100 has a measurement unit 110 and a reporting unit 120.

Figure 1:
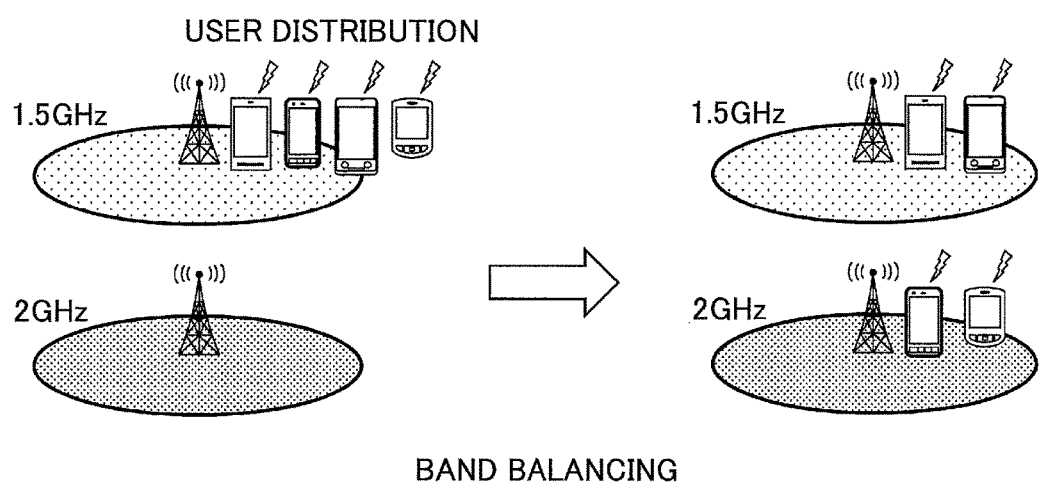
FIG. 1 is a schematic diagram for illustrating exemplary band balancing.
Figure 2:
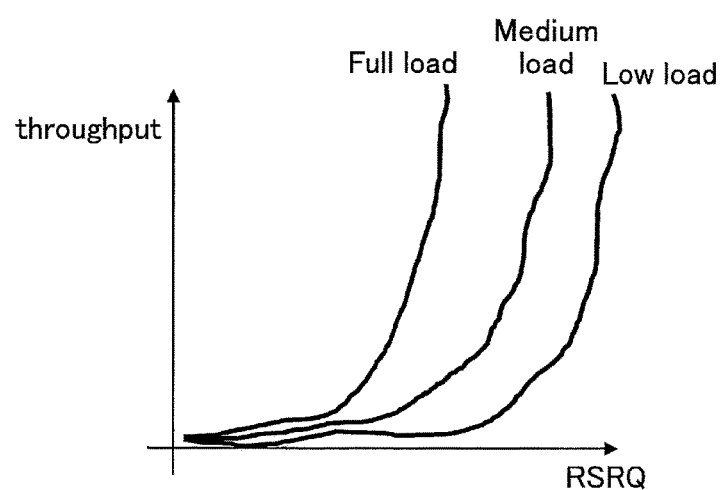
FIG. 2 is a diagram for illustrating an exemplary relationship between the RSRQ and the throughput.
Figure 3:
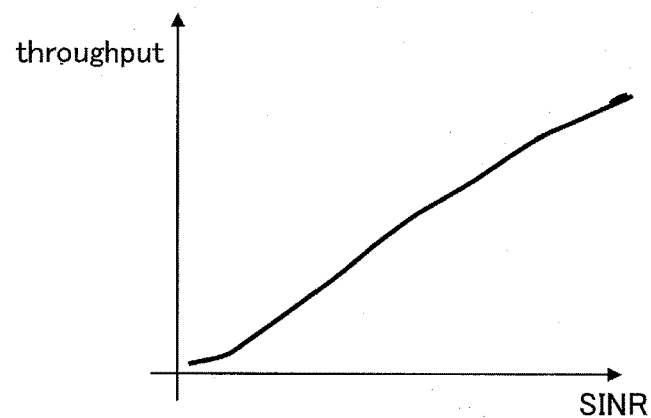
FIG. 3 is a diagram for illustrating an exemplary relationship between the SINR and the throughput.

The measurement unit 110 measures an RS-SINR (Reference Signal-Signal to Interference and Noise Ratio) for a reference signal in a physical downlink control channel (PDCCH) transmitted from the base station 200. The RS-SINR is an SINR measured for a reference signal in a PDCCH transmission domain. As stated above, the RS-SINR serves as an indicator to estimate a feasible throughput in a band balancing target cell at a high accuracy, and the relationship between the throughput and the RS-SINR is almost linear, as illustrated in FIG. 3.

In one or more embodiments, the measurement unit 110 may further measure one or both of an RSRQ (Reference Signal Received Quality) and an RSRP (Reference Signal Received Power) together with the RS-SINR. The RSRQ and the RSRP are indicators indicative of reception quality and reception power, respectively, of a signal transmitted from the base station 200 and can be effectively used to determine whether the user equipment 100 is located near the base station 200 or in a cell edge.

The reporting unit 120 reports the measured RS-SINR to the base station 200 in accordance with a predefined reporting trigger. In one or more embodiments, the reporting unit 120 may report the measured RS-SINR to the base station 200 in accordance with a reporting trigger based on the measured RS-SINR value. For example, the predefined reporting trigger may be an Event, a Periodic or an Event Periodic Triggered Measurement as specified in LTE standard, and an operator of the radio communication system 10 may predefine which of the reporting triggers should be used, or the base station 200 may specify which of the reporting triggers should be used as needed.

In one or more embodiments, the reporting unit 120 may report the measured RS-SINR to the base station 200 in response to the measured RS-SINR satisfying a predefined event condition (Event), report the measured RS-SINR to the base station 200 periodically (Periodic), or report the measured RS-SINR to the base station 200 for a period of satisfaction of a predefined event condition from a time point of satisfaction of the measured RS-SINR with the predefined event condition (Event Periodic Triggered Measurement).

Figure 6:
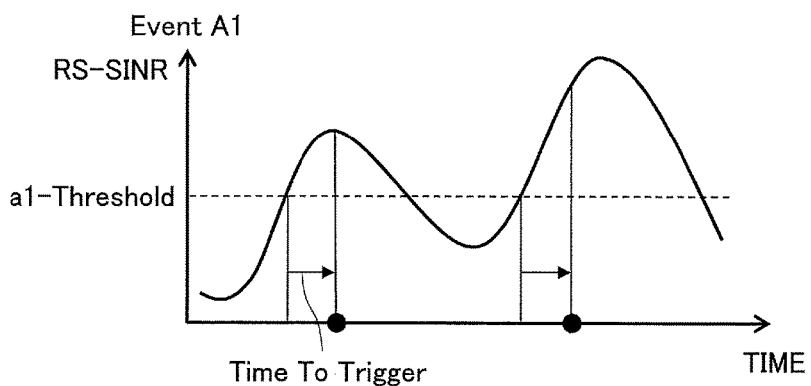
FIGS. 6(A), 6(B), and 6(C) are diagrams for illustrating various reporting triggers according to one or more embodiments of the present invention.
Figure 6:
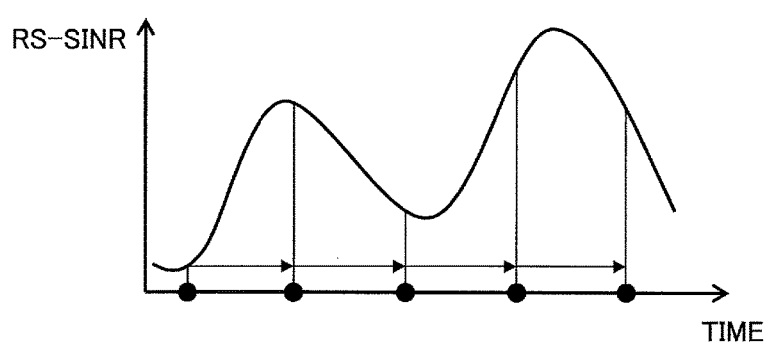
Figure 6:
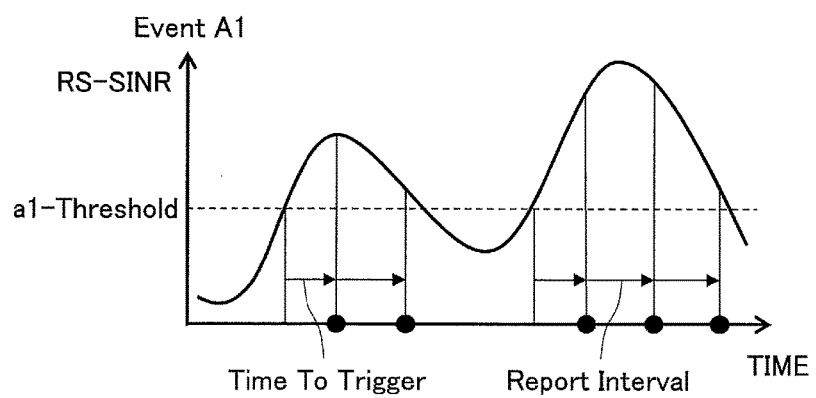

In the Event type of reporting trigger, for example, the predefined event condition may be that the measured RS-SINR has exceeded a predefined threshold "a1-Threshold" for a predefined period "Time To Trigger", as illustrated in FIG. 6(A), and the reporting unit 120 may report the measured RS-SINR to the base station 200 upon passage of the predefined period "Time To Trigger" from exceeding the predefined threshold "a1-Threshold". In the Event type of reporting trigger, as illustrated, when the reporting unit 120 reports the RS-SINR to the base station 200 in response to satisfaction of the predefined event condition, the next reporting occasion will be when the predefined event condition is satisfied again after the RS-SINR temporarily falls below the predefined threshold "a1-Threshold". As a result, if the base station 200 has failed to receive the RS-SINR from the user equipment 100 due to some reasons, the base station 200 may not be able to recognize the RS-SINR for the user equipment 100 until the next reporting occasion.

In the Periodic type of reporting trigger, for example, the reporting unit 120 reports the measured RS-SINR to the base station 200 periodically, as illustrated in FIG. 6(B). Since the user equipment 100 transmits the RS-SINR periodically in the Periodic type of reporting trigger, overhead will increase. Accordingly, an appropriate cycle must be set.

In the Event Periodic Triggered Measurement type of reporting trigger, for example, the predefined event condition is that the measured RS-SINR has exceeded the predefined threshold "a1-Threshold" for the predefined period "Time To Trigger", as illustrated in FIG. 6(C), and as long as the RS-SINR remains above the predefined threshold "a1-Threshold", the reporting unit 120 continues transmitting the measured RS-SINR to the base station 200 in a predefined interval "Report Interval". Note that the maximum of periodic transmissions may be limited to a predefined value "Report Amount" for each satisfaction of the event condition.

In the above-stated embodiment, the reporting unit 120 reports the measured RS-SINR to the base station 200 in accordance with a predefined reporting trigger based on the RS-SINR value, but the present invention is not limited to it. In other words, the reporting unit 120 may report one or both of the measured RSRQ and RSRP together with the measured RS-SINR to the base station 200.

In another embodiment, the reporting unit 120 may report the measured RS-SINR to the base station 200 in accordance with a reporting trigger based on the measured RSRQ or RSRP value. Specifically, the reporting unit 120 may report the measured RS-SINR to the base station 200 in response to the measured RSRQ or RSRP satisfying a predefined event condition (Event), report the measured RS-SINR to the base station 200 periodically (Periodic), or report the measured RS-SINR to the base station 200 for a period of satisfaction of a predefined event condition from a time point of satisfaction of the measured RSRQ or RSRP with the predefined event condition (Event Periodic Triggered Measurement).

Figure 7:
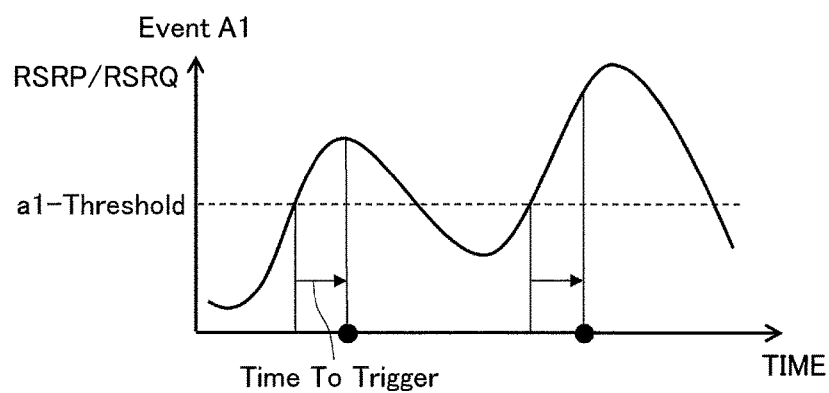
FIGS. 7(A), 7(B), and 7(C) are diagrams for illustrating various reporting triggers according to one or more embodiments of the present invention.
Figure 7:
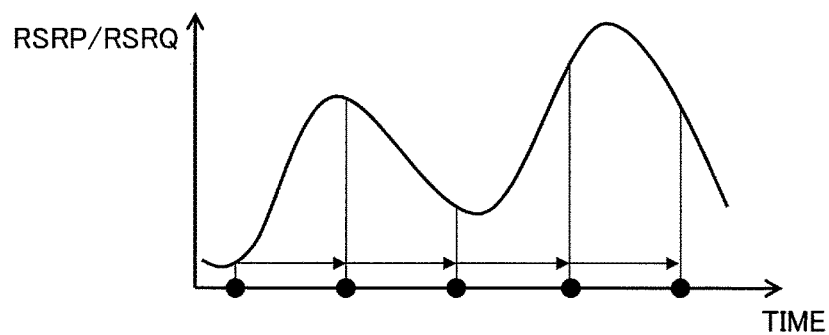
Figure 7:
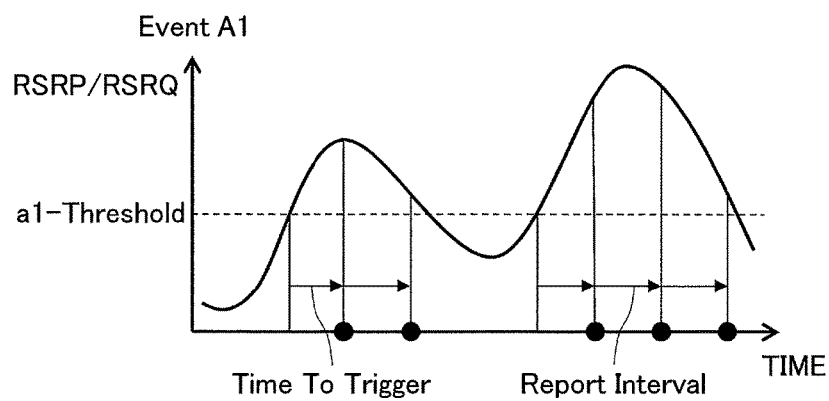

In the Event type of reporting trigger, for example, the predefined event condition may be that the measured RSRQ or RSRP has exceeded a predefined threshold "a1-Threshold" for a predefined period "Time To Trigger", as illustrated in FIG. 7(A), and the reporting unit 120 may report the measured RS-SINR to the base station 200 upon passage of the predefined period "Time To Trigger" from exceeding the predefined threshold "a1-Threshold". In the Event type of reporting trigger, as illustrated, when the reporting unit 120 reports the RS-SINR to the base station 200 in response to satisfaction of the predefined event condition, the next reporting occasion will be when the predefined event condition is satisfied again after the RSRQ or RSRP temporarily falls below the predefined threshold "a1-Threshold". As a result, if the base station 200 has failed to receive the RS-SINR from the user equipment 100 due to some reasons, the base station 200 may not be able to recognize the RS-SINR for the user equipment 100 until the next reporting occasion.

In the Periodic type of reporting trigger, for example, the reporting unit 120 reports the measured RS-SINR to the base station 200 periodically, as illustrated in FIG. 7(B). Since the user equipment 100 transmits the RS-SINR periodically in the Periodic type of reporting trigger, overhead will increase. Accordingly, an appropriate cycle must be set. Note that the reporting trigger in FIG. 7(B) is apparently equivalent to the reporting trigger in FIG. 6(B).

In the Event Periodic Triggered Measurement type of reporting trigger, for example, the predefined event condition is that the measured RSRQ or RSRP has exceeded the predefined threshold "a1-Threshold" for the predefined period "Time To Trigger", as illustrated in FIG. 7(C), and as long as the RSRQ or the RSRP remains above the predefined threshold "a1-Threshold", the reporting unit 120 continues transmitting the measured RS-SINR to the base station 200 in a predefined interval "Report Interval". Note that the maximum of periodic transmissions may be limited to a predefined value "Report Amount" for each satisfaction of the event condition.

Also in the above-stated embodiment, the reporting unit 120 may report one or both of the measured RSRQ and RSRP together with the measured RS-SINR to the base station 200 in accordance with a predefined reporting trigger based on the RSRQ or RSRP value.

In another embodiment, the reporting unit 120 may report the measured RS-SINR to the base station 200 in response to a report instruction from the base station 200.

Figure 8:
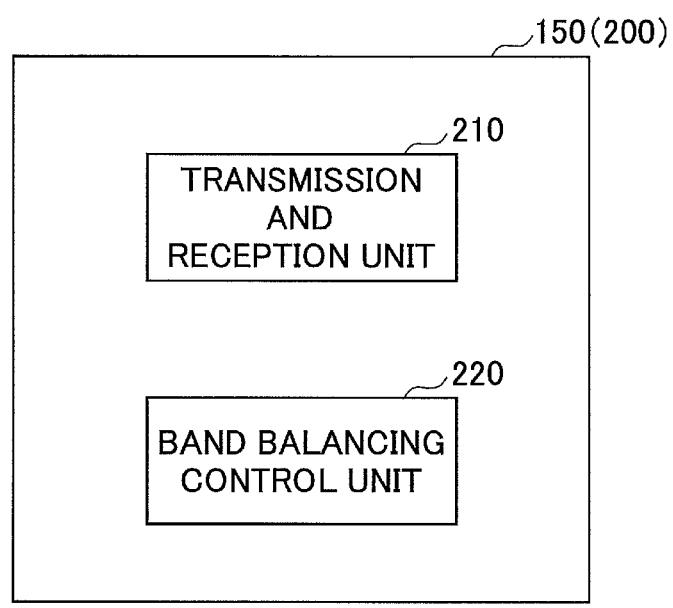
FIG. 8 is a block diagram for illustrating an arrangement of a band balancing controller according to one or more embodiments of the present invention.

Next, an arrangement of a band balancing controller according to one or more embodiments of the present invention is described with reference to FIG. 8. FIG. 8 is a block diagram for illustrating an arrangement of the band balancing controller according to one or more embodiments of the present invention.

As illustrated in FIG. 8, the band balancing controller 150 has a transmission and reception unit 210 and a band balancing control unit 220.

The transmission and reception unit 210 receives an RS-SINR measured for a reference signal in a physical downlink control channel from the user equipment 100. Specifically, the transmission and reception unit 210 receives the RS-SINRs in cells for multiple frequency bands from the user equipment 100 having a multiband function and provides the received RS-SINRs to the band balancing control unit 220.

The band balancing control unit 220 performs band balancing control for the user equipment 100 based on the received RS-SINR and instructs the transmission and reception unit 210 to indicate a band balancing target cell for the user equipment 100 to the user equipment 100. In one or more embodiments, the band balancing control unit 220 compares the RS-SINR for the camped cell received from the user equipment 100 with the RS-SINR in a cell for a frequency band different from the camped cell and instructs the user equipment 100 to migrate to the cell having the higher RS-SINR. This is because a higher throughput can be expected for the cell having the higher RS-SINR.

In another embodiment, the band balancing control unit 220 may perform the band balancing control for the user equipment 100 based on the received RS-SINR together with traffic amounts of the camped cell and a candidate band balancing target cell for the camped cell and instruct the transmission and reception unit 210 to indicate the band balancing target cell for the user equipment 100 to the user equipment 100. For example, if the RS-SINRs for the camped cell and the candidate band balancing target cell are substantially the same, the band balancing control unit 220 instructs the user equipment 100 to migrate to a cell having a less amount of traffic. As a result, it is possible to avoid traffic congestion at a certain base station 200.

Figure 9:
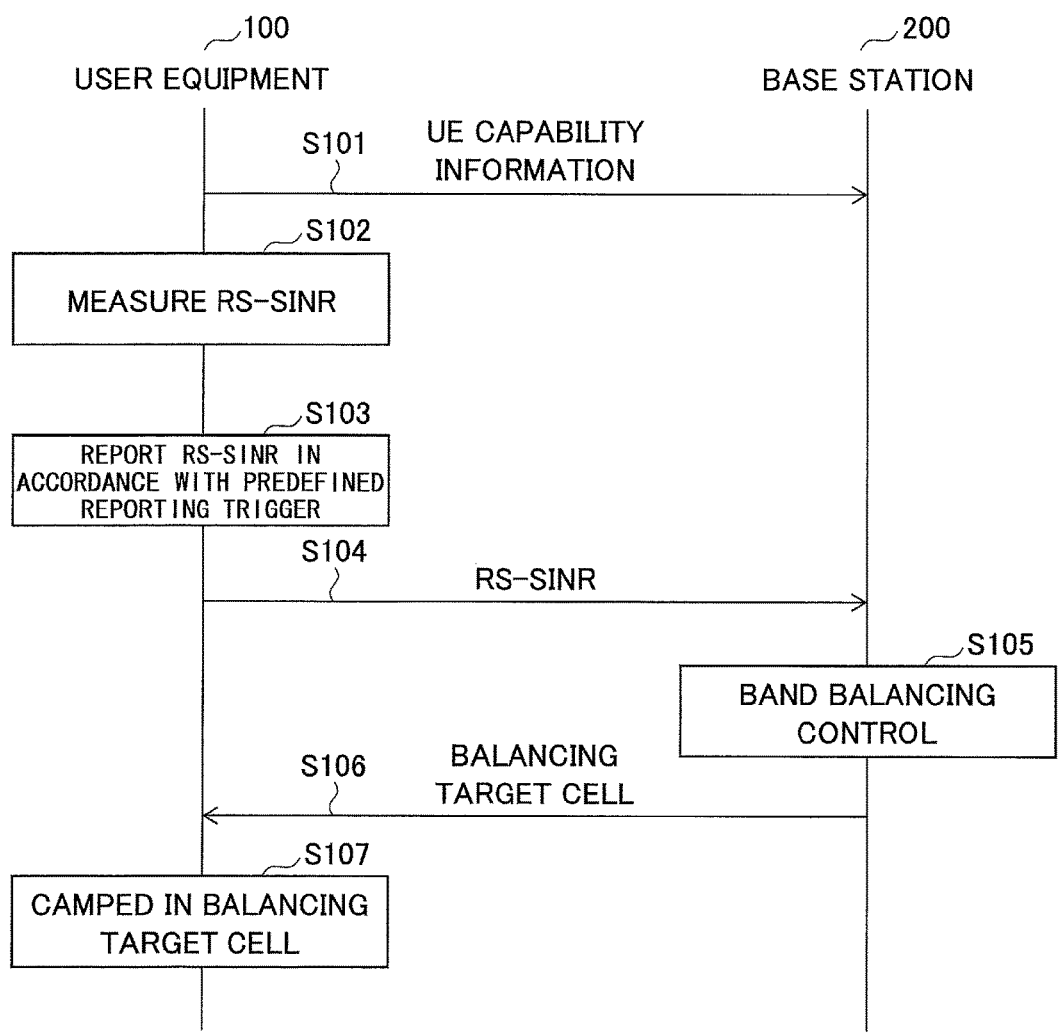
FIG. 9 is a sequence diagram for illustrating an RS-SINR reporting operation according to one or more embodiments of the present invention.

Next, an RS-SINR reporting operation in the user equipment according to one or more embodiments of the present invention is described with reference to FIG. 9. FIG. 9 is a sequence diagram for illustrating an RS-SINR reporting operation according to one or more embodiments of the present invention. In the illustrated embodiment, the band balancing controller 150 is installed in the base station 200 and performs band balancing control over cells of different frequency bands served by the base station 200.

As illustrated in FIG. 9, at step S101, the user equipment 100 camping in or connected to the base station 200 provides UE Capability to the base station 200. The base station 200 determines whether the user equipment 100 supports the multiband function based on the provided UE Capability and if the user equipment 100 supports the multiband function, activates the band balancing control over the user equipment 100.

At step S102, the user equipment 100 measures the RS-SINR for a reference signal in a physical downlink control channel transmitted from the base station 200. In another embodiment, the user equipment 100 may measure an RSRP and/or an RSRQ together with the RS-SINR.

At step S103, the user equipment 100 reports the measured RS-SINR to the base station 200 in accordance with a predefined reporting trigger. In one or more embodiments, the user equipment 100 may report the measured RS-SINR to the base station 200 in accordance with a reporting trigger based on the measured RS-SINR value. For example, the user equipment 100 may report the measured RS-SINR to the base station 200 in response to the measured RS-SINR satisfying a predefined event condition, report the measured RS-SINR to the base station 200 periodically, or report the measured RS-SINR to the base station 200 for a period of satisfaction of a predefined event condition from a time point of satisfaction of the measured RS-SINR with the predefined event condition.

In another embodiment, if the user equipment 100 measures the RSRP and/or the RSRQ together with the RS-SINR, the user equipment 100 may report the measured RS-SINR to the base station 200 in accordance with a reporting trigger based on the measured RSRQ or RSRP value. For example, the user equipment 100 may report the measured RS-SINR to the base station 200 in response to the measured RSRQ or RSRP satisfying a predefined event condition, report the measured RS-SINR to the base station 200 periodically, or report the measured RS-SINR to the base station 200 for a period of satisfaction of a predefined event condition from a time point of satisfaction of the measured RSRQ or RSRP with the predefined event condition.

At step S104, the base station 200 receives the RS-SINRs in the camped cell and a candidate band balancing target cell for a frequency band different from that for the camped cell from the user equipment 100.

At step S105, the base station 200 performs band balancing control for the user equipment 100 and determines a band balancing target cell for the user equipment 100 based on the RS-SINRs received for the camped cell and the candidate band balancing target cell at step S104 and traffic amounts of the camped cell and the candidate band balancing target cell.

At step S106, the base station 200 indicates the determined band balancing target cell to the user equipment 100. For example, if the user equipment 100 is connected to the base station 200 in an RRC CONNECTED state, the indication may be implemented by a handover instruction. Alternatively, if the user equipment 100 subsequently transitions to an IDLE state such as at call termination, the indication may be implemented by an RRC Connection Release.

At step S107, the user equipment 100 camps in the band balancing target cell indicated from the base station 200.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-029796 filed on Feb. 19, 2014, the entire contents of which are hereby incorporated by reference.

LIST OF REFERENCE SYMBOLS

10: radio communication system
100: user equipment
150: band balancing controller
200: base station

The invention claimed is:
1. A user equipment, comprising:
a processor that measures:
  a Reference Signal-Signal to Interference and Noise Ratio (RS-SINR) for a reference signal in a physical downlink control channel transmitted from a base station; and
  at least one of a Reference Signal Received Quality (RSRQ) and a Reference Signal Received Power (RSRP); and
a transmitter that reports the measured RS-SINR to the base station in accordance with a reporting trigger based on the measured RSRQ or RSRP value.
2. The user equipment as claimed in claim 1, wherein the transmitter reports the at least one of the measured RSRQ and RSRP together with the measured RS-SINR to the base station.
3. The user equipment as claimed in claim 1, wherein the transmitter reports the measured RS-SINR to the base station in response to the measured RSRQ or RSRP satisfying a predefined event condition, reports the measured RS-SINR to the base station periodically, or reports the measured RS-SINR to the base station for a period of satisfaction of a predefined event condition from a time point of satisfaction of the measured RSRQ or RSRP with the predefined event condition.

4. The user equipment as claimed in claim 3, wherein the transmitter reports the at least one of the measured RSRQ and RSRP together with the measured RS-SINR to the base station.

\* \* \* \* \*